United States Patent Office 3,328,437
Patented June 27, 1967

3,328,437
ADDUCTS OF A QUATERNARY AMMONIUM SALT WITH A PHENOL
Richard M. Lee, deceased, late of Leominster, Mass., by Mary G. Lee, sole legatee, Louisville, Ky., and Richard G. McAllister, Leominster, Mass., assignors to The Borden Company, New York, N.Y., a corporation of New Jersey
No Drawing. Continuation of application Ser. No. 179,454, Mar. 13, 1962. This application Feb. 1, 1966, Ser. No. 525,220
4 Claims. (Cl. 260—404)

This is a continuation application of application Ser. No. 179,454, filed Mar. 13, 1962, now abandoned.

This invention relates to an antistatic material and to resin compositions containing the said material.

The invention is particularly useful in preventing the accumulation of or accelerating leakage of electric charges in sound records, coating for fabrics and the like and will be illustrated by description in connection with such use.

Quaternary ammonium compounds have been used extensively for this purpose. Certain disadvantages have persisted, however, in their use. Quaternary ammonium salts such as Catanac SN, for example, when incorporated directly into a composition for phonograph records in amounts needed to impart desirable antistatic properties, cause excessive lubricity of the composition and thus retard dispersion of the various components in the composition during milling. Mixing of the salt in advance with the resin constituting the base material, i.e., before the stage of compounding the composition on the usual heated mixing rollers, has been proposed as means of decreasing such over-lubrication and shortening the subsequent milling cycle.

The present invention provides an antistatic material that (1) is dispersible with satisfactory results in the resin at the compounding stage, (2) avoids over-lubricity in the compounded composition, (3) is effective in proportion less than the amount of the relatively expensive quaternary component required previously, and (4) minimizes the discoloration, especially of vinyl chloride homopolymers and copolymers, which is caused by larger amounts of the quaternary salt.

Briefly stated, the invention comprises the herein described process and product of heating a mixture consisting essentially of a quaternary ammonium salt with a phenol. The invention comprises also the blend of the product of the said heating with a resin and to the resulting antistatic compositions and articles made therefrom.

As the resin or base material to be made antistatic there is used any of the polymers of ethenoid monomers commonly employed in making sound records, coatings for fabrics or automobile seat covers as, for example, a polyvinyl chloride resin, polystyrene or polyvinylidene chloride. The vinyl chloride resin may be the homopolymer or the copolymers of vinyl chloride as the component in major amount, such as 50%–98% of the copolymer, with such other copolymerizable ethenoid monomers as vinyl acetate, butyrate, and stearate and methyl and ethyl or other $C_1$–$C_4$ alkyl esters of acrylic or methacrylic acids. A particularly suitable copolymer is one containing about 83%–88% of vinyl chloride and 17%–12% of vinyl acetate for 100 parts total. The styrene resin may be the homopolymer of styrene or alpha-methylstyrene.

The phenol used is ordinarily bisphenol A, that is 2,2-bis(p-hydroxyphenyl)propane. Other phenols that can be used in place of the bisphenol A are p-tert. butyl phenol, p-phenyl phenol, bis(p-hydroxyphenyl) methane, and 4,4'-dihydroxy bisphenyl. The hydroxyl group of the aromatic nucleus of the phenol must be free, i.e., unsubstituted to make the phenol operative. Phenol ethers, for example, are inoperative for our purpose.

As the quaternary we use any water soluble quaternary ammonium compound that alone is effective in causing discharge of static electricity from plastics, e.g., as an antistatic agent.

The compound used is ordinarily a quaternary salt containing at least 2 $C_1$–$C_4$ alkyl groups which preferably are both methyl and 2 other monovalent radicals that may be alkyl, aryl, alkaryl, aralkyl or oxy-substitution products thereof. The anion of the salt may be a halide, sulfate, hydrogen sulfate, phosphate, hydrogen phosphate or the like. Examples of such quaternaries that we use are Catanac SN (dimethyl stearamidopropyl 2-hydroxyethyl ammonium nitrate), Catanac SP (dimethyl stearamidopropyl 2-hydroxyethyl ammonium dihydrogen phosphate), Cetol (cetyl dimethyl benzyl ammonium chloride), Ammonyx 4002 (stearyl dimethyl benzyl ammonium chloride), cetyl diethyl benzyl ammonium chloride, Arquad 12–50, triethyl alkyl ammonium chloride, the alkyl being mixed dodecyl and tetradecyl, and Hyamine 1622 (diisobutylphenoxyethoxyethyl dimethyl benzyl ammonium chloride).

In addition to the phenol and the quaternaries, we can introduce various conventional materials for their usual purposes that are without substantial effect on the antistatic property of the product. Thus the selected resin may be in a blend with the phenol during the heating with the quaternary, as the resin admixture at this stage does not affect adversely the functioning of the phenol and quaternary. Also we may use conventional stabilizers for the resin, as, for instance, the combination of triphenyl phosphite and the laurate of barium, cadmium, or like metal, dibasic lead stearate and tetrabasic lead fumarate; and pigmentary or dye materials of nature commonly used in the articles of the kind to be made. Plasticizers are not required in sound records. For other purposes dibutyl or dioctyl phthalate, tricresyl phosphate or other non-volatile solvent that is a conventional plasticizer for the resin selected may be incorporated in usual amounts.

The conventional materials, if introduced at all, are in proportions that are usual for the particular purpose for which the composition is being made as, for example, 1–6 parts of vinyl resin stabilizer for 100 parts of the polyvinyl chloride resin.

Proportions of the critical materials that are to be used are shown in the following table.

| Component | Parts by Weight for 100 Parts of the Resin | |
|---|---|---|
| | Permissible | Recommended |
| Bisphenol A or other phenol | 0.1–2.9 | 0.5–2 |
| Quaternary ammonium compound | 0.1–2.9 | 0.3–1.8 |
| Total of antistatic product of heating above components | 0.5–3 | 0.8–2.5 |

The selected phenol and quaternary ammonium compound are used suitably in approximately equivalent proportions. When the two components are heated together in the equivalent ratio, the adduct obtained is completely soluble in water whereas bisphenol A by itself, for example, dissolves only to the extent of 0.1% in water. If an excess of phenol over the quaternary salt is used, the excess phenol remains insoluble in water.

Equivalent ratios are 1 mole of the quaternary for 1 of the phenol when the anion of the quaternary salt is monovalent, ½ mole of the quaternary when the anion is divalent, etc. When such reaction giving water solubility to the phenol is not necessary, we can use 1–4 equivalents of either the phenol or the quaternary ammonium compound for 1 equivalent of the other.

The proportion recommended is at least an equivalent weight of the quaternary for each mole of the phenol that is to be made miscible in cold water.

A ratio that causes reaction of a sufficient proportion to the phenol for sound record compositions is 2 moles of the phenol for each mole of the quaternary ammonium compound in which the anion is that of a monovalent group, e.g., chloride or nitrate.

As to conditions, we heat the selected phenol and quaternary ammonium compound to a temperature to cause complete solution of one in the other, as to between 100°–200° C. for a period of about 2 hours or for a shorter or longer period depending upon the exact temperature of heating and components selected. The heating time is that required at the temperature used to convert a representative phenol such as bisphenol A and a representative quaternary salt such as Catanac SN to a thick viscous oil. When equimolecular proportions of the phenol and the quaternary with monovalent anion are used, the mixture is heated until the entire composition is water-soluble. No further substantial change of viscosity or properties of the product would occur on further heating. When an excess of phenol is used over the quaternary present, the mixture is heated until the only precipitation noted in an aqueous solution of the mass is the amount of phenol used in excess of 1 mole for 1 mole of the quaternary salt.

The quaternary ammonium compound and the selected phenol can be introduced separately into the resin on the compounding rolls and blended thereon, as by hot milling at temperatures of about 100°–200° C. and preferably 140°–170° C. The small amount of acid which deevlops from the polyvinyl chloride resin during this heating accelerates the desired reaction between the phenol and the quaternary compound. When these two components are premixed in advance and heated to give the desired action of the one upon the other, before incorporation into the resin, it is desirable to add a small amount of an acid catalyst as, for instance, hydrochloric, sulfuric or phosphoric acid as in the proportion of about .001%–0.1% of the total weight of the quaternary and selected phenol. This acid speeds up the desired reaction of the phenol and quaternary without any adverse effect on the antistatic properties of the compositions.

The invention will be further illustrated by detailed description in connection with the following specific examples. In these examples and elsewhere herein, proportions are expressed as parts by weight unless specifically stated to the contrary.

*Example 1*

On heated compounding rollers there were mixed the following: Copolymer of 85 parts of vinyl chloride with 15 parts of vinyl acetate, 100 parts; bisphenol A, 0.6 part; Catanac SN, 0.6 part; and dibasic lead stearate as stabilizer for the copolymer resin, 1.5 parts.

The above mixture was blended and milled at 140° C. for 5 minutes. The stock was then removed from the mill and molded under pressure into sheets 6 x 6 x 0.075 inch.

Molded stock is evaluated for antistatic properties by first inducing a surface charge by friction with a brush, as the stock is motor-rotated against the brush, the charge so developed being observed with an electrometer. When a predetermined level of charge has been reached, the motor is stopped and the decay time noted as a measure of the leakage rate.

The molded stock made as described in this example accumulated no observable electrostatic charge during the brushing. The stock, consequently, must be considered as 100% antistatic at the relative humidity then prevailing which is estimated at 30%–40%.

Another test for antistatic properties known as the cigarette ash test is as follows: The surface of the molded slab is rubbed 50 times with a cloth and immediately passed about ½ inch above a bed of finely divided cigarette ash. A sample having no antistatic properties will be covered with ash. A sample having excellent antistatic properties will show no pick-up of ashes.

The molded stock above showed no pick-up of ash in this cigarette ash test.

The molded, pressed stock including the product of heating the bisphenol A with Catanac SN also exhibited desirable processing characteristics, absence of excess lubricity during processing, good compatibility of the compounded components over a wide range of temperatures, and better color than a molded slab using the quaternary salt only as the antistatic agent.

The table below shows some of the results obtained with our agent, here referred to as an adduct, test 2 and 3 being included only for contrast.

| Run No. | Antistatic Agent | Antistatic Agent, Percent or Resin | Antistatic Properties | Processing Properties |
| --- | --- | --- | --- | --- |
| 1 | Adduct of Catanac SN and bisphenol A.[1] | 1.2 | Excellent | Excellent. |
| 2 | Catanac SN [1] | 1.2 | ___do___ | Poor. |
| 3 | Catanac SN preabsorbed on the resin. | 1.2 | ___do___ | Good. |

[1] Added on the mill, not preabsorbed on the resin.

*Example 2*

An antistatic agent herein called "adduct a" was prepared separately by heating 1 mole of bisphenol A (228 parts) with 1 mole of Catanac SN (478 parts) with gentle stirring at a temperature of 140°–170° C. After 3 hours' heating, the product was a highly viscous liquid (95,000–100,000 cps. at 25° C.) with a strong yellow to brown color. There was no separation of the bisphenol A when the product was stirred and dissolved in water to a concentration of 75% by weight at ordinary temperatures. The product was completely miscible in methanol, acetone, and chloroform.

Adduct b was prepared by heating 2 moles of bisphenol A (456 parts) with 1 mole of Catanac SN (478 parts) with gentle stirring at a temperature of 140°–170° C., and with 0.01% of 37% hydrochloric acid solution admixed as a catalyst of the action. After 2 hours' heating the product was a highly viscous liquid of viscosity 100,000 cps. at 25° C., with a strong brown color. When 10 parts of adduct b was mixed with 100 parts of water, a white precipitate appeared. This was collected and dried, to give 2.4 parts of a white powder of melting point 155° C. (Bisphenol A melts at 152° C.) The phenol in excess of 1 mole for 1 of the quaternary in adduct b is thus seen to have been unreacted with the quaternary salt and to remain insoluble. This adduct, while only partially miscible in water, is completely miscible in methanol, chloroform, acetone, and ether.

Additive c was prepared by the process steps described above for adduct a except as noted to the contrary. Thus 0.62 mole (478 parts) of Triton X–102 (ethoxylated octyl phenol, containing 12–13 ethoxy groups and being originally water miscible) and 1 mole of Catanac SN (478 parts) were heated until they formed a viscous liquid which solidified on cooling to a wax that was completely miscible in water, methanol, chloroform, and acetone but formed a hazy dispersion in ether.

Adduct *d* was prepared as described above for adduct *a* except that the materials heated were 2 moles (300 parts) of para-t-butyl phenol and 1 mole (478 parts) of Catanac SN. The physical and solubility properties of the product were similar to those of adduct *b*.

Adduct *e* was prepared by the process steps used above for adduct *a* except that 1 mole (228 parts) of bisphenol A and 1 mole (447.5 parts) of Hyamine 1622 (di-isobutylphenoxy ethoxyethyl dimethyl benzyl ammonium chloride) were the components mixed and heated. The physical and solubility properties of adduct *e* were similar to those of adduct *a*.

These adducts and the additive were then compounded separately on heated mixing rollers at 140° C. for 5 minutes (unless otherwise noted) in the following compositions.

| Component: | Parts |
|---|---|
| Copolymer of vinyl chloride 85 parts, 15 parts with vinyl acetate | 96.8 |
| Dibasic lead stearate | 2.0 |
| Antistatic adduct or additive | 1.2 |
| Total | 100.0 |

The stock was then removed from the mill and molded under pressure into sheets 6 x 6 x .075 inches and tested for antistatic properties by the tests described in Example 1.

The following table shows the processing properties and ultimate antistatic properties obtained for each compound with 1.2% of the adduct or additive on the total weight.

| Test Number | 1 | 2 | 3 | 4 | 5 | 6 | 7 |
|---|---|---|---|---|---|---|---|
| Additive tested | None | Catanac SN | Additive *c* | Adduct *a* | Adduct *b* | Adduct *d* | Adduct *e*. |
| Additive made, from Phenol, kind. | do | None | Ethoxylated octyl phenol. | Bis-phenol A | Bis-ph enol A | Para-t. butyl phenol. | Bisphenol A. |
| Phenol, moles for 1 mole of quaternary salt. | do | do | 0.62 | 1 | 2 | 2 | 1. |
| Quaternary | do | See above | Catanac SN | Catanac SN | Catanac SN | Catanac SN | Hyamine 1622. |
| Milling Characteristics: | | | | | | | |
| Bank time (min.) [1] | 1.5 | 7.75 | 10.0 | 1.5 | 1.5 | 1.5 | 1.5. |
| Drop throughs required [2] | 1 | 3 | 3 | 1 | 1 | 1 | 1. |
| Total time, min | 5 | 10 | 12 | 5 | 5 | 5 | 5. |
| Antistatic Properties: | | | | | | | |
| Charge decay time by electrometer, min. | 10 | 0 | 2–3 | 0–.1 | 0–.1 | 0–.1 | 1. |
| Ash test pickup | Yes | No | Yes | No | No | No | Slt. |
| Color of plastic | Translucent, hazy. | Opaque, beige | Translucent, tan. | Opaque, off-white. | Opaque, off-white. | Opaque, off-white. | Opaque, off-white. |

[1] Time required to work a workable sheet on the mill.
[2] Number of times the material drops through the mill before adhering and fusing.

The compositions of tests 1, 2 and 3 form no part of this invention, they being used merely for control purposes. Each of these controls either fails in milling characteristics or antistatic properties and in tests 1 and 3 in both. Test 3 is particularly significant. It shows that the phenol which has been ethoxylated, with conversion of the OH group of the phenol to an ether group, was unsatisfactory as a starting material.

The table shows also the relative economy of the compositions compounded with the adducts over that with the relatively expensive Catanac SN alone. In test No. 2, for instance, the proportion of Catanac SN is 1.2% of the plastic whereas the percentages of it in the better compositions of tests 4, 5 and 6 are only 0.81%, 0.62% and 0.70%, respectively.

Example 3

The antistatic material adduct *a* produced as described in Example 2 was incorporated into a polymer of styrene on the hot mixing rollers and the mixing and subsequent processing conducted as described in Example 1. The product was satisfactory as to both antistatic and processing properties including absence of excess of lubricity.

Example 4

A coating composition was made as follows:
100 parts of the copolymer of 85% of vinyl chloride and 15% of vinyl acetate were dissolved in 1,000 parts of toluene as the solvent. Into this there was then added and dissolved one part of the antistatic material, adduct *b*, prepared in Example 2. Films of the resulting solution were sprayed and dried, to a final thickness of 1 mil on automobile upholstery fabric. The film when rubbed with a brush as described in Example 1 did not retain any static charge, whatever charge was induced being lost by leakage substantially as rapidly as formed.

In another test, this one outside the invention, a toluene solution of the same concentration of the same copolymer was used in comparable manner except that the antistatic material was omitted. This solution was sprayed on the automobile fabric, the solvent evaporated and the remaining film brushed as described. A pronounced static charge developed.

Example 5

The procedure and composition of Example 1 are used except that the quaternary ammonium salt there used is replaced by an equal weight of dimethyl stearamidopropyl 2-hydroxyethyl ammonium nitrate and phosphate, cetyl dimethyl benzyl ammonium chloride, stearyl dimethyl benzyl ammonium chloride, cetyl diethyl benzyl ammonium chloride, and triethyl alkyl ammonium chloride in which the alkyl is mixed dodecyl and tetradecyl, and diisobutylphenoxyethoxyethyl dimethyl benzyl ammonium chloride, used separately and in turn.

Example 6

The procedure and composition of Example 1 are used except that the bisphenol A therein is replaced by an equimolar amount of p-tert. butyl phenol, p-phenyl phenol, bis(p-hydroxyphenyl) methane, and 4,4'-dihydroxy bisphenyl, used separately and in turn.

Example 7

The procedure and composition of Example 1 are used except that the copolymer of vinyl chloride and vinyl acetate is replaced by an equal weight of vinyl chloride, a copolymer of about 50%–98% of vinyl chloride and 50%–2% of vinyl acetate, butyrate and stearate, polystyrene, and a polyvinylidene chloride, used separately and in turn.

It will be understood that it is intended to cover all changes and modifications of the examples of the invention herein chosen for the purpose of illustration which do not constitute departures from the spirit and scope of the invention.

We claim:
1. The process of making a product of a phenol and a quaternary ammonium salt which comprises:
   (1) forming a mixture of one mole of a phenol selected from the group consisting of:
      (a) 2,2'-bis(p-hydroxyphenol)propane,
      (b) p-tert. butyl phenol,
      (c) p-phenyl phenol,
      (d) bis(p-hydroxyphenyl)methane, and

(e) 4,4'-dihydroxy bisphenyl, with at least one mole of a quaternary ammonium salt containing at least $2C_4$ alkyl groups, said salt being selected from the group consisting of:
   (a) dimethyl stearamidopropyl 2-hydroxyethyl ammonium phosphate,
   (b) dimethyl stearamidopropyl 2-hydroxyethyl ammonium nitrate,
   (c) cetyl dimethyl benzyl ammonium chloride,
   (d) cetyl diethyl benzyl ammonium chloride,
   (e) stearyl dimethyl benzyl ammonium chloride,
   (f) dimethyl stearamidopropyl 2-hydroxyethyl ammonium dihydrogen phosphate,
   (g) triethyl alkyl ammonium chloride in which the said alkyl is a mixture of dodecyl and tetradecyl, and
   (h) diisobutylphenoxyethoxyethyl dimethyl benzyl ammonium chloride, and, (2) heating said mixture in the temperature range between about 100°–200° C. to a complete soltuion and until there is no further substantial change in viscosity on continuing the heating.

2. The process of claim 1, wherein:
(1) said phenol is 2,2'-bis(p-hydroxyphenol) propane, and
(2) said salt is dimethyl stearamidopropyl 2-hydroxyethyl ammonium nitrate.

3. An antistatic agent consisting essentially of the product of:
   (1) forming a mixture of one mole of a phenol selected from the group consisting of:
      (a) 2,2'-bis(p-hydroxyphenol)propane,
      (b) p-tert. butyl phenol,
      (c) p-phenyl phenol,
      (d) bis(p-hydroxyphenyl)methane, and
      (e) 4,4'-dihydroxy bisphenyl, with at least one mole of a quaternary ammonium salt containing at least $2C_4$ alkyl groups, said salt being selected from the group consisting of:
   (a) dimethyl stearamidopropyl 2-hydroxyethyl ammonium phosphate,
   (b) dimethyl stearamidopropyl 2-hydroxyethyl ammonium nitrate,
   (c) cetyl dimethyl benzyl ammonium chloride,
   (d) cetyl diethyl benzyl ammonium chloride,
   (e) stearyl dimethyl benzyl ammonium chloride,
   (f) dimethyl stearamidopropyl 2-hydroxyethyl ammonium dihydrogen phosphate,
   (g) triethyl alkyl ammonium chloride in which the said alkyl is a mixture of dodecyl and tetradecyl, and
   (h) diisobutylphenoxyethoxyethyl dimethyl benzyl ammonium chloride, and, (2) heating said mixture in the temperature range between about 100°–200° C. to a complete solution and until there is no further substantial change in viscosity on continuing the heating.

4. The antistatic agent of claim 3, wherein:
(1) said phenol is 2,2'-bis(p-hydroxyphenol) propane, and
(2) said salt is dimethyl stearamidopropyl 2-hydroxyethyl ammonium nitrate.

No references cited.

CHARLES B. PARKER, *Primary Examiner.*

ANTON H. SUTTO, *Assistant Examiner.*